G. B. FISHER.
TRACTOR.
APPLICATION FILED APR. 2, 1919.

1,310,653.

Patented July 22, 1919.
2 SHEETS—SHEET 1.

Inventor
Guy B. Fisher

By
Hardway & Carty
Attorneys

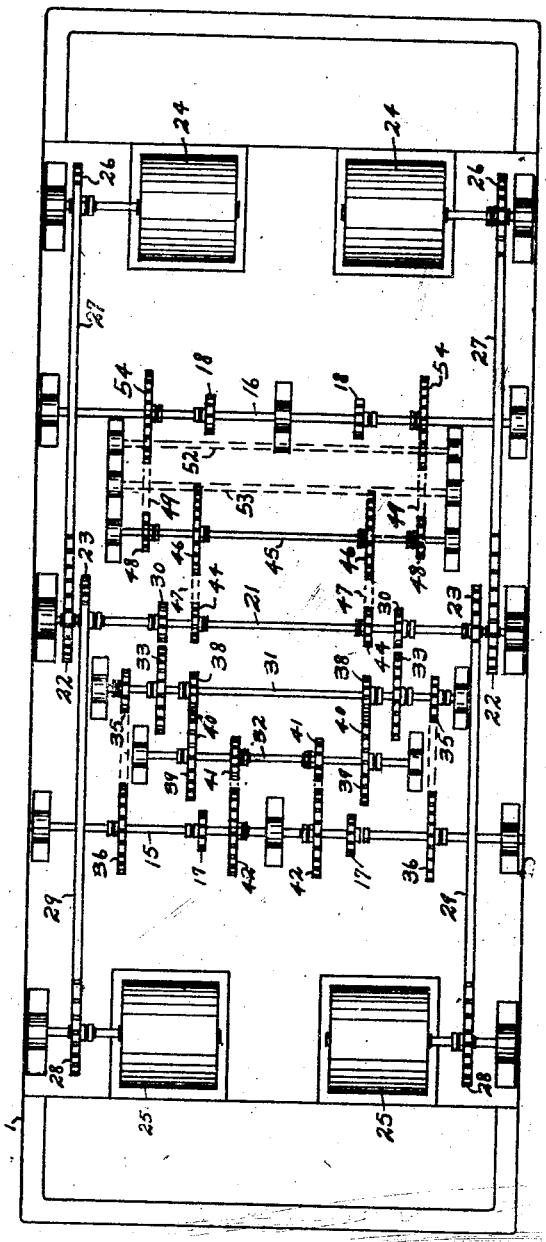

UNITED STATES PATENT OFFICE.

GUY B. FISHER, OF HOUSTON, TEXAS.

TRACTOR.

1,310,653.   Specification of Letters Patent.   Patented July 22, 1919.

Application filed April 2, 1919. Serial No. 286,943.

*To all whom it may concern:*

Be it known that I, GUY B. FISHER, a citizen of the United States, residing at Houston, in the county of Harris and State of Texas, have invented certain new and useful Improvements in Tractors, of which the following is a specification.

This invention relates to new and useful improvements in a tractor.

One object of the invention is to provide a tractor of the caterpillar type, having a caterpillar on each side, said caterpillars being independently driven either forwardly or reversely.

Another object of the invention is to provide a tractor wherein the caterpillar on one side may be driven at a greater rate of speed, than the one on the other side for the purpose of changing the course of the machine, and wherein the caterpillar on one side may be driven forwardly, and the one on the other side may be driven reversely, to enable the machine to be readily turned around in small space.

A further feature of the invention resides in the provision of a tractor having a countershaft which may be operatively connected with one or a plurality of motors mounted on the machine, and through which the power is transmitted from said motor to the traction mechanism.

With the above and other objects in view, the invention has particular relation to certain novel features of construction, operation and arrangement of parts, an example of which is given in this specification and illustrated in the accompanying drawings, wherein:

Fig. 3, is a plan view.

Figure 1:
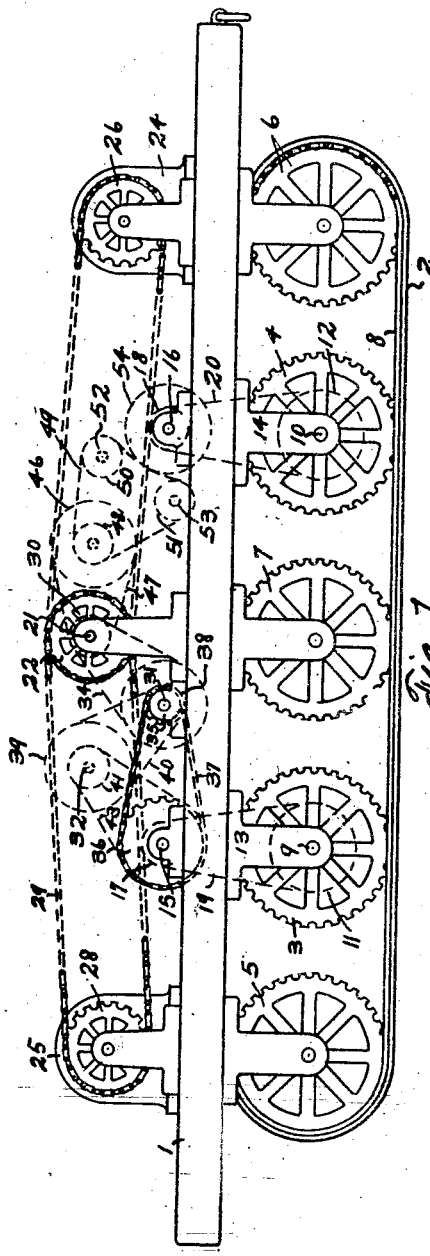
Figure 1, is a side view of a tractor.
Figure 2:
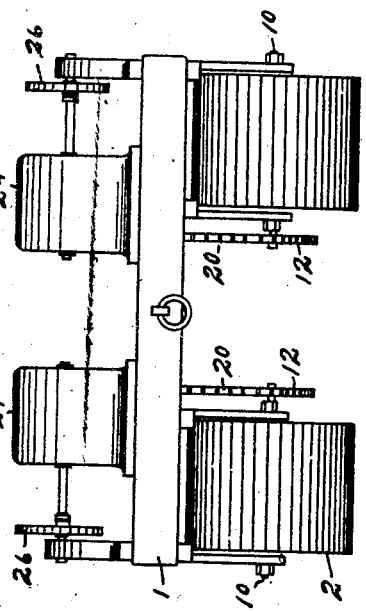
Fig. 2, is a rear end view, with the driving mechanism removed for the sake of clearness.

Referring now more particularly to the drawings, wherein like numerals of reference designate similar parts in each of the figures, the numeral 1, refers to the frame of the tractor, and the numerals 2, 2, refer to the caterpillars through which the tractor is propelled. These caterpillars are driven through the front and rear sprocket wheels 3 and 4, and move over the front and rear idler sprocket wheels 5 and 6, and the central sprocket wheel 7, said caterpillars being provided with the usual sprocket chains, as 8, which mesh with said respective sprocket wheels, and through which the caterpillars on each side are driven. The front driving sprocket wheels 3 are fixed upon the short shafts 9, 9, and the rear driving sprocket wheels 4, are fixed upon the short shafts 10, 10. The inner end of each shaft 9 has a relatively large sprocket wheel 11, fixed thereon, and the inner end of each of the shafts 10, has a relatively large sprocket wheel 12, fixed thereon. The shafts 9 and 10 are rotatably mounted in suitable bearings as 13 and 14. Depending from the frame and rotatably mounted in suitable bearings carried by the frame are the respective shafts 15 and 16, which are alined above the corresponding shafts 9 and 10. Mounted on the shaft 15, and alined above the sprocket wheels 11, are the small sprocket wheels 17, 17, and mounted on the shaft 16, and alined above the corresponding sprocket wheels 12, are the small sprocket wheels 18, 18, said sprocket wheels 17 and 18 being provided with clutches whereby they may be clutched with or declutched from their respective shafts. Operating over the respective sprocket wheels 11 and 17, are the sprocket chains 19, 19, and likewise operating over the corresponding sprocket wheels 12 and 18, are the sprocket chains 20, 20, and through these respective sprocket chains rotation is imparted to the shafts 9 and 10, and the driving sprocket wheels 3 and 4, fixed thereon.

Rotatably mounted in suitable bearings carried by the side members of the frame, there is a central countershaft 21, and mounted upon the ends thereof, are the respective sprocket wheels 22, 22, and 23, 23, each of which is capable of being clutched with said shaft or declutched from it. Mounted upon the framework, at one end, is a plurality of motors 24, 24, and at the other end, there is a plurality of motors 25, 25. The shafts of the motors 24 have the sprocket wheels 26, located thereon and capable of being clutched with and declutched from said shafts, and operating over the respective sprocket wheels 22, and 26, on each side, are the sprocket chains 27, 27, through which the former may be driven from the latter. Located upon these shafts of the motors 25, 25, are the sprocket wheels 28, 28, which are capable of being clutched with or declutched from their respective shafts. And operating over the sprocket wheels 23, and 28, respectively on each side are the sprocket chains 29, through which the former may be driven from the latter. From the foregoing, it is obvious that one or any number of said motors 24 and 25 may be operatively connected with the countershaft 21 to drive the same. In case a light load is being propelled, it will be necessary to connect only one of said motors with said countershaft, and as the load is increased, additional motors may be connected to propel the same, in accordance with the weight of the load to be propelled. A great saving of motive power will be thus effected, inasmuch as it will be necessary to operate only the required number of motors to propel the load. If only one motor be used, there will be considerable loss of motive power, when a load is propelled not requiring the full capacity of the motor, and for that reason, a plurality of small motors have been provided so that only a sufficient number may be used to propel the load being carried.

The countershaft 21 has the small sprocket wheels 30, 30, mounted thereon, one on each side, which are capable of being clutched therewith, and declutched therefrom, and located in front of said countershaft and rotatably mounted in suitable bearings carried by the frame, there are the transverse shafts 31 and 32. Located on the shaft 31, there are the relatively large sprocket wheels 33, 33, capable of being clutched with and declutched from said shaft, and in alinement with the corresponding sprocket wheels 30, 30, and operating over these sprockets wheels, and imparting rotation from the latter to the former, there are the respective sprocket chains 34. Located on the shaft 21, near its respective ends are the relatively small sprocket wheels 35, 35, which are capable of being clutched with and declutched from said shaft, and in alinement therewith, are the respective sprocket wheels 36, 36, which are located on the shaft 15, and which are capable of being clutched with and declutched from said shaft. Operating over the corresponding sprocket wheels 35 and 36, on each side, and transmitting power from the former to the latter are the respective sprocket chains 37. Through the mechanism just described, power may be transmitted from the countershaft 21, to the transverse shaft 15, and from it to the caterpillars on each side, and the tractor thus driven forwardly. For the purpose of changing the speed for giving a slower speed ahead, I have mounted the relatively small sprocket wheels 38, 38, on the shaft 31, which are capable of being clutched with and declutched from said shaft, and in alinement therewith, I have mounted upon the shaft 32, the relatively large sprocket wheels 39, 39, which are capable of being clutched with and declutched from said shaft 32, and operating over the corresponding sprocket wheels 38 and 39, and transmitting power from the former to the latter are the sprocket chains 40, 40. And mounted upon the shaft 32, are the relatively small sprocket wheels 41, 41, which are capable of being clutched with and declutched from the shaft on which they are mounted, and in alinement therewith, on the shaft 15, there are the relatively large sprocket wheels 42, 42, arranged to be clutched with and declutched from said shaft 15, and the sprocket chains 43, 43, operate over the respective sprocket wheels 41, and 42, and transmit rotation from the former to the latter. In order to give the tractor a slower speed ahead, the sprocket wheels 35 and 36 on each side are declutched from their shafts, and the sprocket wheels 38, 39, 41 and 42, on each side, are clutched with their respective shafts, and a lower speed ahead thus obtained, and for the purpose of changing the direction of the tractor as in going around curves, or in following an irregular course, it is obvious that the driving mechanism may be shifted, so as to give a high speed to the caterpillar on one side and a lower speed to the caterpillar on the other side, and the desired result thus obtained.

For the purpose of reversing the tractor to drive it backwardly, a reversing mechanism has been provided which will now be described. Mounted upon the countershaft 21, are the relatively small sprocket wheels 44, 44, which are arranged to be clutched with and declutched therefrom, and alined with them, and mounted upon the transverse shaft 45, located behind said countershaft, are the larger sprocket wheels 46, 46, arranged to be clutched with and declutched from said shaft 45, and operating over the corresponding sprocket wheels 44, and 46, on each side, are the respective sprocket chains 47, 47, through which the latter is driven from the former. Mounted on the shaft 45, there are also the sprocket wheels 48, 48, over which the sprocket chains 49 operate. These chains also operate over the idler sprocket wheels 50, 50, and 51, 51, which are fixed upon the respective transverse shafts 52, and 53, which are rotatable in suitable bearings carried by the frame, and the sprocket chains 49, also mesh with the front sides of the larger sprocket wheels 54, 54, which are carried by the shaft 16, and which are arranged to be clutched with and declutched from said shaft. In order to reverse the machine, the mechanism for driving the tractor forwardly is declutched as hereinabove explained, and the sprocket wheels 44, 46 and 54 are clutched with their respective shafts. The shaft 16 is thus rotated in the reverse direction, and operates through the sprocket chains 20, to drive the sprocket wheels 4, in a corresponding direction.

It is obvious that the reversing mechanism may be entirely declutched and the tractor thus driven forwardly either at low or high speed, or it may be driven forwardly at high speed on one side, and at low speed on the other, or the mechanism for driving the tractor forwardly may be declutched, and the reversing mechanism operatively connected with the countershaft 21, and the tractor driven rearwardly, or the caterpillar on one side may be operatively connected with the mechanism, for driving the tractor forwardly, and the caterpillar on the other side may be operatively connected with the reversing mechanism, by suitable manipulation of the clutches provided, and the machine thus connected, turned around on small space.

What I claim is:

1. A tractor including a framework, traction caterpillars upon which said framework is mounted, a countershaft carried by the framework, and operatively connected with said caterpillars, whereby the same may be driven forwardly, at variable rates of speed, and through which the same may be driven rearwardly, a plurality of motors mounted on the framework, and means through which said motors may be independently connected to said countershaft.

2. A tractor including a framework, a pair of endless aprons forming traction means upon which said framework is mounted, a motor carried by the framework, a countershaft rotatably mounted on the framework, and operatively connected with said motor, a driving mechanism operatively connected with said countershaft and with said aprons through which the aprons may be driven at variable rates of speed, means for disconnecting said mechanism from either of said aprons, a reversing mechanism operatively connected with said countershaft and with said aprons, and means through which said reversing mechanism may be disconnected from either of said aprons.

In testimony whereof I have signed my name to this specification in the presence of two subscribing witnesses.

GUY B. FISHER.

Witnesses:
R. MARVIN SMITH,
E. V. HARDWAY.